(12) United States Patent
Liu

(10) Patent No.: US 12,518,801 B2
(45) Date of Patent: Jan. 6, 2026

(54) CIRCUITRY AND METHOD FOR PROCESSING DATA, AND SEMICONDUCTOR MEMORY

(71) Applicant: CHANGXIN MEMORY TECHNOLOGIES, INC., Hefei (CN)

(72) Inventor: Zhonglai Liu, Hefei (CN)

(73) Assignee: CHANGXIN MEMORY TECHNOLOGIES, INC., Hefei (CN)

(*) Notice: Subject to any disclaimer, the term of this patent is extended or adjusted under 35 U.S.C. 154(b) by 217 days.

(21) Appl. No.: 18/449,051

(22) Filed: Aug. 14, 2023

(65) Prior Publication Data

US 2023/0410852 A1 Dec. 21, 2023

Related U.S. Application Data

(63) Continuation of application No. PCT/CN2022/124853, filed on Oct. 12, 2022.

(30) Foreign Application Priority Data

Jun. 17, 2022 (CN) .......................... 202210691510.2

(51) Int. Cl.
  *G11C 7/02* (2006.01)
  *G11C 7/10* (2006.01)
  *G11C 7/22* (2006.01)

(52) U.S. Cl.
  CPC .............. *G11C 7/02* (2013.01); *G11C 7/1063* (2013.01); *G11C 7/222* (2013.01)

(58) Field of Classification Search
  CPC ....................................................... G11C 7/02
  USPC ....................................................... 365/191
  See application file for complete search history.

(56) References Cited

U.S. PATENT DOCUMENTS

| | | | |
|---|---|---|---|
| 5,668,770 A * | 9/1997 | Itoh .................. | G11C 11/417 365/156 |
| 6,922,372 B2 | 7/2005 | Suzuki | |
| 8,793,525 B2 * | 7/2014 | Zerbe ................. | G06F 13/4243 713/400 |
| 10,305,461 B2 * | 5/2019 | Kushnarenko ........ | G11C 7/065 |
| 10,726,917 B1 | 7/2020 | Bedeschi | |
| 10,943,654 B2 | 3/2021 | Bedeschi | |

(Continued)

FOREIGN PATENT DOCUMENTS

| CN | 115102511 A | 9/2022 |
|---|---|---|
| CN | 115206365 A | 10/2022 |

(Continued)

OTHER PUBLICATIONS

International Search Report in the international application No. PCT/CN2022/124853, mailed on Feb. 23, 2023. 3 pages.

*Primary Examiner* — Muna A Techane
(74) *Attorney, Agent, or Firm* — Syncoda LLC; Feng Ma

(57) ABSTRACT

A circuitry for processing data includes a receiving circuit, a compensation circuit and a processing circuit. The receiving circuit is configured to receive a data signal, and determine a first node signal according to the data signal. The compensation circuit is configured to receive an initial compensation signal, and determine a target compensation signal according to the initial compensation signal. The processing circuit is configured to output a target data signal according to the first node signal and the target compensation signal. A method for processing data and a semiconductor memory are also provided.

20 Claims, 8 Drawing Sheets

(56) References Cited

U.S. PATENT DOCUMENTS

| | | |
|---|---|---|
| 11,145,367 B2 | 10/2021 | Bedeschi |
| 2005/0013178 A1* | 1/2005 | Suzuki ................ G11C 7/1072 365/194 |
| 2015/0041001 A1 | 2/2015 | Li |
| 2020/0234761 A1 | 7/2020 | Bedeschi |
| 2020/0321053 A1 | 10/2020 | Bedeschi |
| 2021/0166756 A1 | 6/2021 | Bedeschi |
| 2022/0101917 A1 | 3/2022 | Bedeschi |

FOREIGN PATENT DOCUMENTS

| | | | |
|---|---|---|---|
| JP | 2001093993 | A | 4/2001 |
| JP | 2006221796 | A | 8/2006 |

* cited by examiner

CIRCUITRY AND METHOD FOR PROCESSING DATA, AND SEMICONDUCTOR MEMORY

CROSS-REFERENCE TO RELATED APPLICATIONS

The present application is a continuation of International Patent Application No. PCT/CN2022/124853, filed on Oct. 12, 2022, which claims priority to Chinese Patent Application No. 202210691510.2 filed on Jun. 17, 2022 and entitled "CIRCUIT AND METHOD FOR PROCESSING DATA, AND SEMICONDUCTOR MEMORY". The contents of International Patent Application No. PCT/CN2022/124853 and Chinese Patent Application No. 202210691510.2 are hereby incorporated by reference in their entireties.

TECHNICAL FIELD

The disclosure relates to the technical field of semiconductor circuits, and in particular to a circuitry and method for processing data, and a semiconductor memory.

BACKGROUND

Semiconductor memories are very important parts of a digital integrated circuit (IC), and they play a crucial role in construction of an application system of a microprocessor. In recent years, various semiconductor memories have been increasingly embedded inside processors, to make the processors have higher integration and faster operating speeds. However, due to influences such as actual manufacturing processes, process design or the like, deviations are inevitably present in semiconductor memory circuits, which may result in data transmission errors.

SUMMARY

Embodiments of the disclosure provide a circuitry and method for processing data, and a semiconductor memory.

According to a first aspect, an embodiment of the disclosure provides a circuitry for processing data, including a receiving circuit, a compensation circuit and a processing circuit.

The receiving circuit is configured to receive a data signal, and determine a first node signal according to the data signal.

The compensation circuit is configured to receive an initial compensation signal, and determine a target compensation signal according to the initial compensation signal.

The processing circuit is configured to output a target data signal according to the first node signal and the target compensation signal.

According to a second aspect, an embodiment of the disclosure provides a method for processing data, applied to a circuitry for processing data which includes a receiving circuit, a compensation circuit and a processing circuit, the method includes the following operations.

A data signal is received by the receiving circuit, and a first node signal is determined according to the data signal.

An initial compensation signal is received by the compensation circuit, and a target compensation signal is determined according to the initial compensation signal.

A target data signal is output by the processing circuit according to the first node signal and the target compensation signal.

According to a third aspect, an embodiment of the disclosure provides a semiconductor memory, including the circuitry for processing data as described in any paragraph of the first aspect.

The embodiments of the disclosure provide a circuitry and method for processing data, and a semiconductor memory. The circuitry for processing data includes a receiving circuit, a compensation circuit and a processing circuit. The receiving circuit is configured to receive a data signal, and determine a first node signal according to the data signal. The compensation circuit is configured to receive an initial compensation signal, and determine a target compensation signal according to the initial compensation signal. The processing circuit is configured to output a target data signal according to the first node signal and the target compensation signal. In this way, current mismatch of the processing circuit during operation may be reduced by the compensation circuit, and when the processing circuit processes the first node signal according to the target compensation signal, the target data signal output finally is a compensated data signal, which improves output accuracy; furthermore, parasitic capacitance between nodes may also be reduced by performing design adjustment on composition of the compensation circuit, thereby improving high-speed characteristics of the circuitry for processing data and improving data processing speeds.

DETAILED DESCRIPTION

Figure 1:
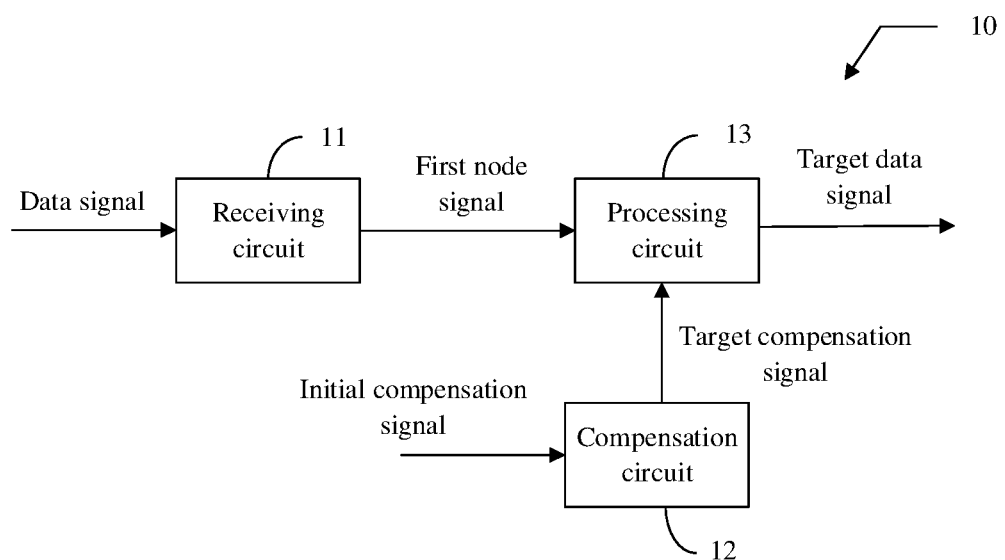
FIG. 1 is a first schematic diagram of composition structure of a circuitry for processing data according to an embodiment of the disclosure.

Technical solutions in the embodiments of the disclosure will be clearly and completely described below with reference to the drawings in the embodiments of the disclosure. It may be understood that specific embodiments described here are only intended to explain relevant disclosures, rather than limiting the disclosures. Furthermore, it should also be noted that only portions related to the relevant disclosures are shown in the drawings, to facilitate descriptions.

Unless otherwise defined, all technical and scientific terms used here have the same meanings as those usually understood by technician of the technical field to which the disclosure belongs. The terms used here are only intended to describe the embodiments of the disclosure, and are not intended to limit the disclosure.

In the following descriptions, reference is made to "some embodiments" which describe a subset of all possible embodiments, however, it may be understood that "some embodiments" may be the same subset or different subsets of all possible embodiments, and may be combined with each other without conflict.

It should be noted that terms "first\ second\ third" involved in the embodiments of the disclosure are only intended to distinguish similar objects and do not represent a particular order of the objects, and it may be understood that "first\ second\ third" may be interchanged in a particular order or sequence if allowable, to enable the embodiments of the disclosure described here to be implemented in an order other than that illustrated or described here.

Due to influences such as actual manufacturing processes, process design or the like, deviations are inevitably present in semiconductor memory circuits, which may result in data transmission errors or even data transmission mistakes.

An embodiment of the disclosure provides a circuitry for processing data, which includes a receiving circuit, a compensation circuit and a processing circuit. The receiving circuit is configured to receive a data signal, and determine a first node signal according to the data signal. The compensation circuit is configured to receive an initial compensation signal, and determine a target compensation signal according to the initial compensation signal. The processing circuit is configured to output a target data signal according to the first node signal and the target compensation signal. In this way, current mismatch of the processing circuit during operation may be reduced by the compensation circuit. When the processing circuit processes the first node signal according to the target compensation signal, the target data signal output finally is a compensated data signal, which improves output accuracy; furthermore, parasitic capacitance between nodes may also be reduced by performing design adjustment on composition of the compensation circuit, high-speed characteristics of the circuitry for processing data is improved, thereby improving data processing speed.

The embodiments of the disclosure will be described in detail below with reference to the drawings.

In an embodiment of the disclosure, with reference to FIG. 1, a first schematic diagram of composition structure of a circuitry 10 for processing data according to an embodiment of the disclosure is shown. As shown in FIG. 1, the circuitry 10 for processing data may include a receiving circuit 11, a compensation circuit 12 and a processing circuit 13.

The receiving circuit 11 is configured to receive a data signal, and determine a first node signal according to the data signal.

The compensation circuit 12 is configured to receive an initial compensation signal, and determine a target compensation signal according to the initial compensation signal.

The processing circuit 13 is configured to output a target data signal according to the first node signal and the target compensation signal.

It should be noted that the circuitry 10 for processing data provided in the embodiment of the disclosure may be used as a part of a readout circuit, an amplification circuit, a comparator, a data receiver, a Decision Feedback Equalizer (DFE) circuit, or the like in a memory, and may achieve functions such as data readout, data amplification, data comparison, or the like.

It should also be noted that the receiving circuit 11 is mainly configured to receive the data signal representing a signal processed by the circuitry 10 for processing data. In the embodiment of the disclosure, a junction of the receiving circuit 11 and the processing circuit 13 is marked as a first node, so that the receiving circuit 11 may determine the first node signal at the first node according to the data signal.

Due to influences such as manufacturing processes, process design or the like, deviations are inevitably present in devices of the circuitry for processing data, which may result in data transmission errors or even data transmission mistakes. In the embodiment of the disclosure, the compensation circuit 12 is connected to the processing circuit 13, and the compensation circuit 12 receives the initial compensation signal and generates the target compensation signal according to the initial compensation signal. Therefore, when the processing circuit 13 processes the first node signal to generate the target data signal, the target data signal is obtained by performing compensation based on the target compensation signal, so that problems such as output deviation or the like due to deviations of the devices may be compensated, and data transmission may be done stably and correctly.

It should also be noted that before introducing composition and operation mode of the compensation circuit 12, compositions and operation modes of the receiving circuit 11 and the processing circuit 13 are described first.

Figure 2:
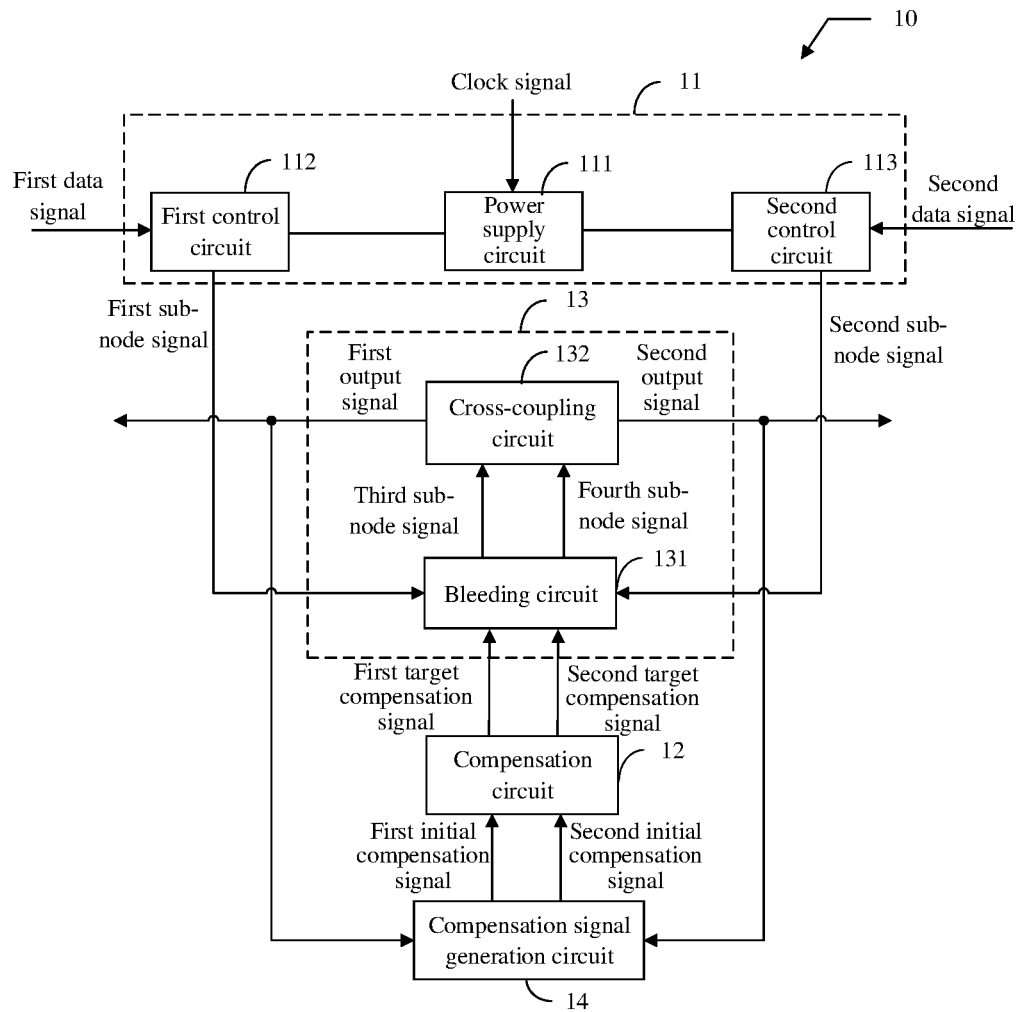
FIG. 2 is a second schematic diagram of composition structure of a circuitry for processing data according to an embodiment of the disclosure.

As to the receiving circuit 11, with reference to FIG. 2, a second schematic diagram of composition structure of a circuitry 10 for processing data according to an embodiment of the disclosure is shown. As shown in FIG. 2, in some embodiments, the receiving circuit 11 may include a power supply circuit 111, a first control circuit 112 and a second control circuit 113, and the data signal may include a first data signal and a second data signal.

The power supply circuit 111 is configured to receive a clock signal, and control connection states between a power supply end and each of the first control circuit 112 and the second control circuit 113 according to the clock signal.

The first control circuit 112 is configured to receive the first data signal, control the first data signal according to the connection state between the power supply end and the first control circuit 112, and generate a first sub-node signal.

The second control circuit 113 is configured to receive the second data signal, control the second data signal according to the connection state between the power supply end and the second control circuit, and generate a second sub-node signal.

It should be noted that as shown in FIG. 2, in the embodiment of the disclosure, the receiving circuit 11 may not only receive the data signal, but also receive the clock signal, and the clock signal is used to control charging and discharging states of the first node. The data signal includes the first data signal and the second data signal. The first control circuit 112 receives the first data signal, and the second control circuit 113 receives the second data signal.

Figure 3:
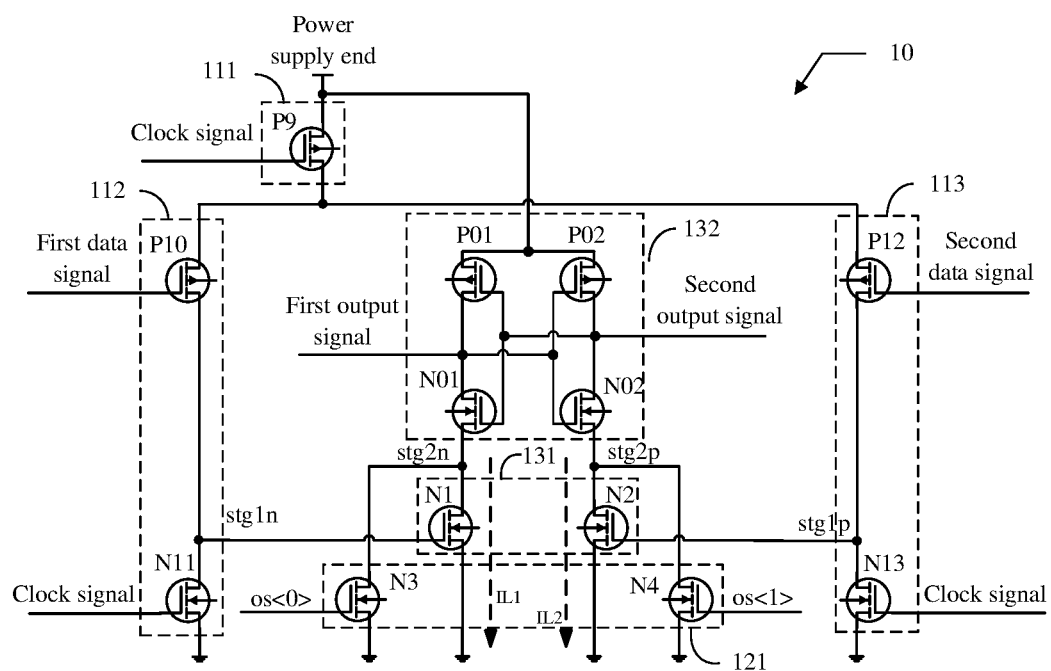
FIG. 3 is a first schematic diagram of specific structure of a circuitry for processing data according to an embodiment of the disclosure.

Specifically, with reference to FIG. 3, a first schematic diagram of specific circuit structure of a circuitry 10 for processing data according to an embodiment of the disclosure is shown. As shown in FIG. 3, the power supply circuit 111 simultaneously controls the connection state between the power supply end and the first control circuit 112 and the connection state between the power supply end and the second control circuit 113 according to the received clock signal. Here, the connection state may include connecting the first control circuit 112 and the second control circuit 113 to the power supply end or disconnecting the first control circuit 112 and the second control circuit 113 from the power supply end.

It should also be noted that in the embodiment of the disclosure, the data signal may include the first data signal and the second data signal. The first control circuit 112 receives the first data signal, and the second control circuit 113 receives the second data signal. Since both the first control circuit 112 and the second control circuit 113 are connected to the processing circuit 13, the first node specifically includes two nodes, and a junction of the first control circuit 112 and the processing circuit 13 is marked as a first sub-node stg1n, and a junction of the second control circuit 113 and the processing circuit 13 is marked as a second sub-node stg1p.

The first control circuit 112 generates the first sub-node signal at the first sub-node stg1n according to the first data signal and the connection state between the first control circuit 112 and the power supply end. Similarly, the second control circuit 113 generates the second sub-node signal at the second sub-node stg1p according to the second data signal and the connection state between the second control circuit 113 and the power supply end.

As shown in FIG. 3, in some embodiments, the power supply circuit 111 may include a ninth switch unit P9. The ninth switch unit P9 is provided with a control terminal configured to receive the clock signal, a first terminal connected to the first control circuit 112 and the second control circuit 113 respectively, and a second terminal connected to the power supply end.

The power supply circuit 111 is configured to: control the ninth switch unit P9 to be in an on-state when the clock signal is in a first level state, so that the first control circuit 112 and the second control circuit 113 are both connected to the power supply end; and control the ninth switch unit P9 to be in an off-state when the clock signal is in a second level state, so that the first control circuit 112 and the second control circuit 113 are disconnected from the power supply end.

It should be noted that the power supply circuit 111 may be achieved through the ninth switch unit P9. The ninth switch unit P9 may be a diode, a triode, a P-type channel Metal Oxide Semiconductor (PMOS) transistor, an N-type channel Metal Oxide Semiconductor (NMOS) transistor, or other devices with switching control functions. Here, specific implementations of the embodiments of the disclosure are described in detail by an example of using the ninth switch unit P9 as a PMOS transistor.

It should also be noted that the control terminal of the ninth switch unit P9 is a gate configured to receive the clock signal, and the ninth switch unit P9 may be turned on or off in response to different level states of the clock signal. The second terminal of the ninth switch unit P9 may be a source connected to the power supply end, and the first terminal of the ninth switch unit P9 may be a drain connected to the first control circuit 112 and the second control circuit 113 respectively. The ninth switch unit P9 is turned on when the clock signal is in the first level state, so that both the first control circuit 112 and the second control circuit 113 may be connected to the power supply end. The first level state represents a low level state, since the ninth switch unit P9 is a PMOS transistor. The ninth switch unit P9 is turned off when the clock signal is in the second level state, neither the first control circuit 112 nor the second control circuit 113 is connected to the power supply end; the second level state represents a high level state, since the ninth switch unit P9 is a PMOS transistor.

Furthermore, as to the first control circuit 112 and the second control circuit 113, as shown in FIG. 3, in some embodiments, the first control circuit 112 includes a tenth switch unit P10 and an eleventh switch unit N11, and the second control circuit 113 includes a twelfth switch unit P12 and a thirteenth switch unit N13.

A control terminal of the tenth switch unit P10 is configured to receive the first data signal, a second terminal of the tenth switch unit P10 is connected to the first terminal of the ninth switch unit P9, a control terminal of the eleventh switch unit N11 is configured to receive the clock signal, and a second terminal of the eleventh switch unit N11 is grounded; a first terminal of the tenth switch unit P10 is connected to a first terminal of the eleventh switch unit N11 to output the first sub-node signal.

A control terminal of the twelfth switch unit P12 is configured to receive the second data signal, a second terminal of the twelfth switch unit P12 is connected to the first terminal of the ninth switch unit P9, a control terminal of the thirteenth switch unit N13 is configured to receive the clock signal, and a second terminal of the thirteenth switch unit N13 is grounded; a first terminal of the twelfth switch unit P12 is connected to a first terminal of the thirteenth switch unit N13 to output the second sub-node signal.

It should be noted that, taking the tenth switch unit P10 and the twelfth switch unit P12 are PMOS transistors and the eleventh switch unit N11 and the thirteenth switch unit N13 are NMOS transistors as an example, in the first control circuit 112 and the second control circuit 113, the control terminal of each of the tenth switch unit P10, the eleventh switch unit N11, the twelfth switch unit P12 and the thirteenth switch unit N13 may represent gate, the first terminal thereof may represent drain, and the second terminal thereof may represent source.

In the first control circuit 112, the gate of the tenth switch unit P10 receives the first data signal, the gate of the eleventh switch unit N11 receives the clock signal, the first terminal of the tenth switch unit P10 and the first terminal of the eleventh switch unit N11 are connected to the first sub-node stg1n, and output the first sub-node signal at the first sub-node stg1n.

In the second control circuit 113, the gate of the twelfth switch unit P12 receives the second data signal, the gate of the thirteenth switch unit N13 receives the clock signal, the first terminal of the twelfth switch unit P12 and the first terminal of the thirteenth switch unit N13 are connected to the second sub-node stg1p, and output the second sub-node signal at the second sub-node stg1p.

Furthermore, in some embodiments, the first control circuit 112 is configured to control the eleventh switch unit N11 to be in an off-state when the clock signal is in the first level state, and control the eleventh switch unit N11 to be in an on-state when the clock signal is in the second level state.

The second control circuit 113 is configured to control the thirteenth switch unit N13 to be in an off-state when the clock signal is in the first level state, and control the thirteenth switch unit N13 to be in an on-state when the clock signal is in the second level state.

It should be noted that each of the eleventh switch unit N11 and the thirteenth switch unit N13 may be an NMOS transistor, and at this point, the first level state represents a low level state, and the second level state represents a high level state. That is, when the clock signal is in the first level state, the gate of each of the eleventh switch unit N11 and the thirteenth switch unit N13 receives the clock signal with a low level and is in the off-state, and when the clock signal is in the second level state, the gate of each of the eleventh switch unit N11 and the thirteenth switch unit N13 receives the clock signal with a high level and is in the on-state.

It should also be noted that in the receiving circuit 11, when the clock signal is in the low level state, the ninth switch unit P9 is in the on-state, and at this point, the first terminal of the ninth switch unit P9 is clamped to a power supply voltage (equivalent to the high level state), the first control circuit 112 and the second control circuit 113 are both connected to the power supply end, that is, the first terminal of each of the tenth switch unit P10 and the twelfth switch unit P12 is connected to the power supply end through the ninth switch unit P9, and pulled up to the power supply voltage. Furthermore, each of the eleventh switch unit N11 and the thirteenth switch unit N13 is in the off-state.

In case that the clock signal is in the low level state: as to the first control circuit 112, when the first data signal is a data signal in the high level state, the tenth switch unit P10 is not turned on (or has a very low degree of conduction), and since neither the tenth switch unit P10 nor the eleventh switch unit N11 is turned on, the first sub-node signal is neither the power supply voltage (the high level state) nor a ground voltage (the low level state); when the first data signal is a data signal in the low level state, the tenth switch unit P10 is turned on, and the first terminal of the tenth switch unit P10 is clamped to the power supply voltage, so that the first sub-node signal is in the high-level state. As to the second control circuit 113, when the second data signal is a data signal with a high level, the twelfth switch unit P12 is not turned on (or has a very low degree of conduction), and since neither the twelfth switch unit P12 nor the thirteenth switch unit N13 is turned on, the second sub-node signal is neither the power supply voltage (the high level state) nor the ground voltage (the low level state); when the second data signal is a data signal in the low level state, the twelfth switch unit P12 is turned on, and the first terminal of the twelfth switch unit P12 is clamped to the power supply voltage, so that the second sub-node signal is in the high-level state. At this point, at least one of the first sub-node stg1n or the second sub-node stg1p is in a charging state, that is, the first sub-node and/or the second sub-node are charged until levels of the nodes gradually become the power supply voltage.

In case that the clock signal is in the high level state: since the ninth switch unit P9 is in the off-state, neither the first control circuit 112 nor the second control circuit 113 is connected to the power supply end. At this time, no matter each of the first data signal and the second data signal is in which level state, neither the tenth switch unit P10 nor the twelfth switch unit P12 is turned on, so that each of the first sub-node signal and the second sub-node signal is not in the high level state. Furthermore, each of the eleventh switch unit N11 and the thirteenth switch unit N13 is in the on-state, and since the second terminal of each of the eleventh switch unit N11 and the thirteenth switch unit N13 is grounded, the first terminal of each of the eleventh switch unit N11 and the thirteenth switch unit N13 is clamped to the ground voltage (equivalent to the low level state), and each of the first sub-node signal and the second sub-node signal is in the low level state. At this point, the first sub-node stg1n and the second sub-node stg1p are in discharging states, that is, the first sub-node and the second sub-node are discharged until levels of the nodes gradually become the ground voltage.

It should also be noted that in an actual application, the first data signal and the second data signal are usually a pair of differential signals, and the first data signal and the second data signal are usually not in high-level states or low-level states simultaneously, instead, in the high-level state and the low-level state respectively. The first control circuit 112 obtains the first sub-node signal according to the first data signal, the second control circuit 113 obtains the second sub-node signal according to the second data signal, and the first sub-node signal and the second sub-node signal may also be regarded as a pair of differential signals.

As to the processing circuit 13, with reference to FIG. 2, in some embodiments, the processing circuit 13 may include a bleeding circuit 131 and a cross-coupling circuit 132.

The bleeding circuit 131 is configured to receive the first node signal and the target compensation signal, and determine a second node signal according to the first node signal and the target compensation signal.

The cross-coupling circuit 132 is configured to amplify the second node signal and output the target data signal.

It should be noted that as shown in FIG. 2, the processing circuit 13 includes two parts, i.e., the bleeding circuit 131 and the cross-coupling circuit 132. In the processing circuit 13, the bleeding circuit 131 receives the first node signal (including the first sub-node signal and the second sub-node signal) and the target compensation signal (including a first target compensation signal and a second target compensation signal) respectively, and compensates the first node signal by using the target compensation signal, to obtain the second node signal (including a third sub-node signal and a fourth sub-node signal) and send the second node signal to the cross-coupling circuit 132. The cross-coupling circuit 132 amplifies the second node signal and outputs the target data signal (including a first output signal and a second output signal) finally.

It should also be noted that when the processing circuit 13 is in operation or standby, leakage current may be generated more or less. The leakage current mainly refers to leakage current generated by the cross-coupling circuit 132, and the bleeding circuit 131 may bleed the leakage current generated by the cross-coupling circuit 132. As to the bleeding circuit 131, mismatch may be inevitably present in internal devices of the bleeding circuit 131 due to manufacturing processes and other reasons, which may further result in mismatch of bleeding capability of the bleeding circuit 131, and finally, the target data signal output by the cross-coupling circuit 132 may be inaccurate or even wrong.

In the embodiments of the disclosure, the compensation circuit 12 is connected before the bleeding circuit 131. The compensation circuit 12 generates the target compensation signal according to the initial compensation signal, and compensates and adjusts the bleeding circuit 131 by using the target compensation signal to reduce mismatch of compensation capability of the bleeding circuit 131, so that the cross-coupling circuit 132 outputs an accurate target data signal.

Furthermore, as to the bleeding circuit 131, as shown in FIG. 3, in some embodiments, the bleeding circuit 131 may include a first switch unit N1 and a second switch unit N2, and the first node signal includes a first sub-node signal and a second sub-node signal.

The first switch unit N1 is provided with a control terminal configured to receive the first sub-node signal, a second terminal grounded, and a first terminal connected to the cross-coupling circuit 132 to determine a third sub-node signal.

The second switch unit N2 is provided with a control terminal configured to receive the second sub-node signal, a second terminal grounded, and a first terminal connected to the cross-coupling circuit 132 to determine a fourth sub-node signal.

It should be noted that as shown in FIG. 3, the bleeding circuit 131 may be composed of the first switch unit N1 and the second switch unit N2, and correspondingly, the first node may include the first sub-node stg1n and the second sub-node stg1p, and the second node may include a third sub-node stg2n and a fourth sub-node stg2p. In the embodiments of the disclosure, a signal at the first sub-node stg1n is defined as the first sub-node signal, a signal at the second sub-node stg1p is defined as the second sub-node signal, a signal at the third sub-node stg2n is defined as the third sub-node signal, and a signal at the fourth sub-node stg2p is defined as the fourth sub-node signal.

The receiving circuit 11 may include the power supply circuit 111, the first control circuit 112 and the second control circuit 113. The control terminal of the first switch unit N1 and the first control circuit 112 are connected to the first sub-node stg1n to receive the first sub-node signal, the first terminal of the first switch unit N1 and the cross-coupling circuit 132 are connected to the third sub-node stg2n to determine the third sub-node signal; the control terminal of the second switch unit N2 and the second control circuit 113 are connected to the second sub-node stg1p to receive the second sub-node signal, the first terminal of the second switch unit N2 and the cross-coupling circuit 132 are connected to the fourth sub-node stg2p to determine the fourth sub-node signal; the second terminal of each of the first switch unit N1 and the second switch unit N2 is grounded, so that leakage current IL1 and leakage current IL2 generated by the cross-coupling circuit 132 may be bled to ground.

Each of the first switch unit N1 and the second switch unit N2 may be an NMOS transistor. The control terminal of each of the first switch unit N1 and the second switch unit N2 may be gate, the first terminal thereof may be drain, and the second terminal thereof may be source.

Furthermore, as to the compensation circuit, as shown in FIG. 3, in some specific embodiments, the compensation circuit may include a first compensation circuit 121, and the initial compensation signal includes a first initial compensation signal and a second initial compensation signal.

The first compensation circuit 121 is configured to receive the first initial compensation signal and the second initial compensation signal, perform compensation control on the first initial compensation signal to generate a first target compensation signal, and perform compensation control on the second initial compensation signal to generate a second target compensation signal.

It should be noted that as shown in FIG. 3, the initial compensation signal may specifically include the first initial compensation signal (represented by os<0> in FIG. 3) and the second initial compensation signal (represented by os<1> in FIG. 3). The first compensation circuit 121 generates the first target compensation signal and the second target compensation signal based on the first initial compensation signal and the second initial compensation signal respectively.

As to the first compensation circuit 121, as shown in FIG. 3, the first compensation circuit 121 may include a third switch unit N3 and a fourth switch unit N4.

The third switch unit N3 is provided with a control terminal configured to receive the first initial compensation signal, a first terminal connected to the first terminal of the first switch unit N1 and the processing circuit to determine the first target compensation signal, and a second terminal grounded.

The fourth switch unit N4 is provided with a control terminal configured to receive the second initial compensation signal, a first terminal connected to the first terminal of the second switch unit N2 and the processing circuit to determine the second target compensation signal, and a second terminal grounded.

It should be noted that as shown in FIG. 3, the first compensation circuit 121 may be composed of the third switch unit N3 and the fourth switch unit N4. Each of the third switch unit N3 and the fourth switch unit N4 being an NMOS transistor is taken as an example in the embodiment of the disclosure, the control terminal of each of the third switch unit N3 and the fourth switch unit N4 may be gate, the first terminal thereof may be drain, and the second terminal thereof may be source.

The control terminal of the third switch unit N3 receives the first initial compensation signal os<0>, so that the first initial compensation signal os<0> may control a degree of conduction of the third switch unit N3, and the first terminal of the third switch unit N3 and the processing circuit are connected to the third sub-node stg2n. Specifically, the first terminal of each of the third switch unit N3 and the first switch unit N1 is connected to the third sub-node stg2n, and the second terminal of the third switch unit N3 is grounded. The control terminal of the fourth switch unit N4 receives the second initial compensation signal os<1>, so that the second initial compensation signal os<1> may control a degree of conduction of the fourth switch unit N4, and the first terminal of the fourth switch unit N4 and the processing circuit are connected to the fourth sub-node stg2p. Specifically, the first terminal of each of the fourth switch unit N4 and the second switch unit N2 is connected to the fourth sub-node stg2p.

That is, as shown in FIG. 3, in the embodiment of the disclosure, a signal at the first terminal of the third switch unit N3 is defined as the first target compensation signal, the first target compensation signal is controlled by the first initial compensation signal, the third switch unit N3 has different degrees of conduction according to different first initial compensation signals, so that the first terminal of the third switch unit N3 is pulled to ground at different degrees, and then a corresponding first target compensation signal is obtained. The same is true for the second target compensation signal, in the embodiment of the disclosure, a signal at the first terminal of the fourth switch unit N4 is defined as the second target compensation signal, and the second target compensation signal is controlled by the second initial compensation signal, the fourth switch unit N4 has different degrees of conduction according to different second initial compensation signals, so that the first terminal of the fourth switch unit N4 is pulled to ground at different levels, and then a corresponding second target compensation signal is obtained.

As shown in FIG. 3, when the circuitry 10 for processing data operates, current bleeding capabilities of the first switch unit N1 and the second switch unit N2 should be as consistent as possible, that is, when signals received by the control terminals of the first switch unit N1 and the second switch unit N2 are the same, a grounding degree at the third sub-node stg2n should be consistent with a grounding degree at the fourth sub-node stg2p correspondingly, that is, the second sub-node signal is consistent with the fourth sub-node signal, however, due to inevitable mismatch of devices themselves, there is always a certain current mismatch there-between. For example, the current bleeding capability of the first switch unit N1 is greater than the current bleeding capability of the second switch unit N2, a grounding degree of the first terminal of the first switch unit N1 is greater than a grounding degree of the first terminal of the second switch unit N2 during current bleeding, that is, a level state of the third sub-node signal is lower than a level state of the fourth sub-node signal when the signals at the control terminals are the same. At this point, at least one of the third sub-node signal or the fourth sub-node signal may be compensated, for example, the fourth sub-node signal may be compensated to reduce the level state of the fourth sub-node signal to be equivalent to that of the third sub-node signal, then a greater second initial compensation signal may be provided so that the fourth switch unit N4 is grounded at a greater degree, thereby pulling the first terminal of the fourth switch unit N4 to ground to obtain a grounded second target compensation signal. At the fourth sub-node stg2$p$, the fourth sub-node signal is formed by combining a signal at the first terminal of the second switch unit N2 with the signal at the first terminal of the fourth switch unit N4, so that the second switch unit N2 may obtain the fourth sub-node signal with a greater grounding degree.

The same is true for compensation of the third sub-node signal. In this way, grounding degrees of the first terminal of the third switch unit N3 and the first terminal of the fourth switch unit N4 are controlled by setting appropriate first and second initial compensation signals, and the first target compensation signal and the second target compensation signal are determined respectively. The first target compensation signal compensates a signal at the first terminal of the first switch unit N1, so that the third sub-node signal obtained by the first terminal of the first switch unit N1 is that corrected by compensation. The second target compensation signal compensates the signal at the first terminal of the second switch unit N2, so that the fourth sub-node signal obtained by the first terminal of the second switch unit N2 is that corrected by compensation. Finally, the current bleeding capability of the first switch unit N1 is equivalent to the current bleeding capability of the second switch unit N2, thereby reducing current mismatch.

Figure 4:
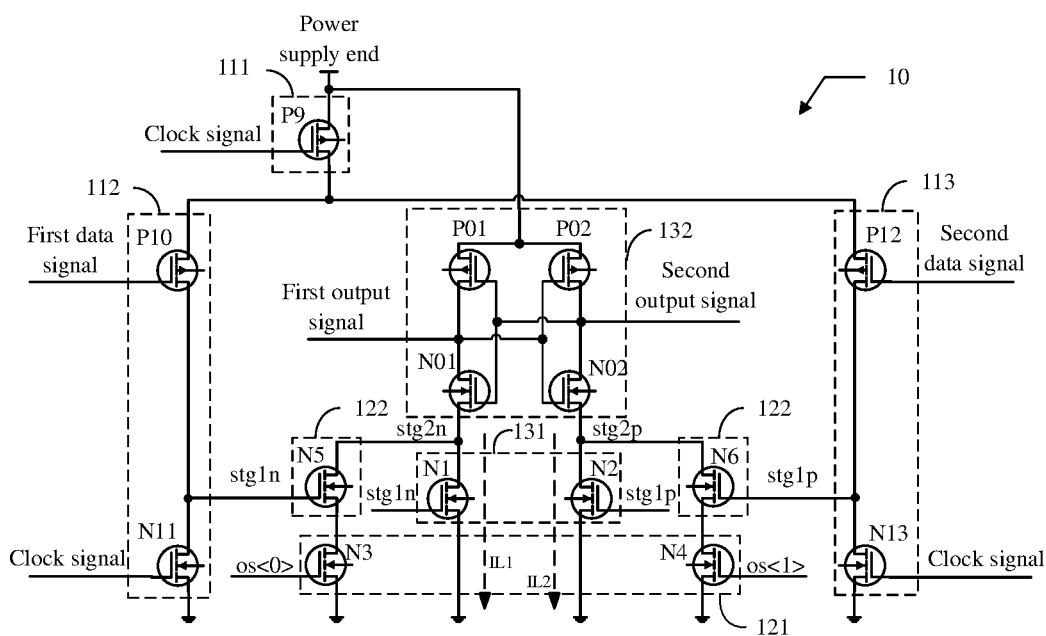
FIG. 4 is a second schematic diagram of specific structure of a circuitry for processing data according to an embodiment of the disclosure.

Furthermore, with reference to FIG. 4, a second schematic diagram of specific circuit structure of a circuitry 10 for processing data according to an embodiment of the disclosure is shown. As shown in FIG. 4, in some other specific embodiments, the compensation circuit may further include a second compensation circuit 122.

The second compensation circuit 122 is configured to receive the first sub-node signal and the second sub-node signal, enhance the first target compensation signal according to the first sub-node signal, and enhance the second target compensation signal according to the second sub-node signal.

It should be noted that FIG. 4 is a further supplement to the compensation circuit based on FIG. 3. As shown in FIG. 4, in addition to the first compensation circuit 121, the compensation circuit may further include the second compensation circuit 122. The second compensation circuit 122 is connected to the first sub-node stg1$n$ and the second sub-node stg1$p$ respectively and is also connected to the first compensation circuit 121. The second compensation circuit 122 receives the first sub-node signal and the second sub-node signal, enhances the first target compensation signal according to the first sub-node signal, and enhances the second target compensation signal according to the second sub-node signal.

Specifically, as shown in FIG. 4, in some embodiments, the second compensation circuit 122 may include a fifth switch unit N5 and a sixth switch unit N6.

The fifth switch unit N5 is provided with a control terminal configured to receive the first sub-node signal, a second terminal connected to the first terminal of the third switch unit N3, and a first terminal connected to the first terminal of the first switch unit N1 and the processing circuit, to determine the first target compensation signal.

The sixth switch unit N6 is provided with a control terminal configured to receive the second sub-node signal, a second terminal connected to the first terminal of the fourth switch unit N4, and a first terminal connected to the first terminal of the second switch unit N2 and the processing circuit, to determine the second target compensation signal.

It should be noted that as shown in FIG. 4, the second compensation circuit 122 may be composed of the fifth switch unit N5 and the sixth switch unit N6. Each of the fifth switch unit N5 and the sixth switch unit N6 being an NMOS transistor is taken as an example, the control terminal of each of the fifth switch unit N5 and the sixth switch unit N6 may be gate, the first terminal thereof may be drain, and the second terminal thereof may be source.

The control terminal of the fifth switch unit N5 is connected to the first control circuit 112 through the first sub-node stg1$n$ to receive the first sub-node signal, the first terminal of the fifth switch unit N5 is connected to the processing circuit through the third sub-node stg2$n$, and the second terminal of the fifth switch unit N5 is connected to the first terminal of the third switch unit N3; that is, compared to FIG. 3, FIG. 4 is equivalent to addition of the fifth switch unit N5 between the third switch unit N3 and the processing circuit. The control terminal of the sixth switch unit N6 is connected to the second control circuit 113 through the second sub-node stg1$p$ to receive the second sub-node signal, the first terminal of the sixth switch unit N6 is connected to the processing circuit through the fourth sub-node stg2$p$, and the second terminal of the sixth switch unit N6 is connected to the first terminal of the fourth switch unit N4; that is, compared to FIG. 3, FIG. 4 is equivalent to addition of the sixth switch unit N6 between the fourth switch unit N4 and the processing circuit.

Therefore, the third switch unit N3 receives the first initial compensation signal, and determines the first target compensation signal at the first terminal thereof according to the first initial compensation signal. Since the second terminal of the fifth switch unit N5 is connected to the first terminal of the third switch unit N3, a signal received by the second terminal of the fifth switch unit N5 is the first target compensation signal determined by the third switch unit N3. At this point, the control terminal of the fifth switch unit N5 receives the first sub-node signal, and according to a level state of the first sub-node signal, the fifth switch unit N5 has different degrees of conduction, or even may not be turned on at all, so that a signal output from the first terminal of the fifth switch unit N5 is pulled to the first target compensation signal, or close to the first target compensation signal, or suspended, or in other states, thereby enhancing the first target compensation signal. At the third sub-node stg2$n$, the enhanced first target compensation signal and the signal at the first terminal of the first switch unit N1 are combined into the third sub-node signal, so that the first switch unit N1 obtains the compensated third sub-node signal. It may be understood that the control terminal of each of the first switch unit N1 and the fifth switch unit N5 receives the first sub-node signal, so that the first switch unit N1 and the fifth switch unit N5 are turned on synchronously. Based on the circuitry 10 for processing data shown in FIG. 4, a compensation degree of compensating the third sub-node signal using the first target compensation signal may be adjusted according to the first sub-node signal, and the first sub-node signal is generated according to the first data signal, that is, the embodiment of the disclosure may adjust the compensation degree according to an input signal, thereby achieving a more accurate compensation effect.

The fourth switch unit N4 receives the second initial compensation signal, and determines the second target compensation signal at the first terminal thereof according to the second initial compensation signal. Since the second terminal of the sixth switch unit N6 is connected to the first terminal of the fourth switch unit N4, a signal received by the second terminal of the sixth switch unit N6 is the second target compensation signal determined by the fourth switch unit N4. At this point, the control terminal of the sixth switch unit N6 receives the second sub-node signal, and according to a level state of the second sub-node signal, the sixth switch unit N6 has different degrees of conduction, or even may not be turned on at all, so that a signal output from the first terminal of the sixth switch unit N6 is pulled to the second target compensation signal, or close to the second target compensation signal, or suspended, or in other states, thereby enhancing the second target compensation signal. At the fourth sub-node stg2p, the enhanced second target compensation signal and the signal at the first terminal of the second switch unit N2 are combined into the fourth sub-node signal, so that the second switch unit N2 obtains the compensated fourth sub-node signal. It may be understood that the control terminal of each of the second switch unit N2 and the sixth switch unit N6 receives the second sub-node signal, so that the second switch unit N2 and the sixth switch unit N6 are turned on synchronously. Based on the circuitry 10 for processing data shown in FIG. 4, a compensation degree of compensating the fourth sub-node signal using the second target compensation signal may be adjusted according to the second sub-node signal, and the second sub-node signal is generated according to the second data signal, that is, the embodiment of the disclosure may adjust the compensation degree according to an input signal, thereby achieving a more accurate compensation effect.

It should also be noted that the first switch unit N1 and the second switch unit N2 may be referred to as a pair of differential transistors, and during manufacturing chips, deviations are inevitably present in the pair of differential transistors such as the first switch unit N1 and the second switch unit N2. In order to compensate such deviation, the embodiment of the disclosure incorporates devices such as the third switch unit N3/the fifth switch unit N5, the fourth switch unit N4/the sixth switch unit N6, or the like into the circuitry 10 for processing data. The third switch unit N3 and the fourth switch unit N4 control selection of left and right circuit compensations. Although a better compensation effect may be achieved in the circuitry 10 for processing data shown in FIG. 4, the first switch unit N1 and the fifth switch unit N5 are arranged in parallel between the first sub-node stg1n and the third sub-node stg2n, which may increase a parasitic capacitance between the first sub-node stg1n and the third sub-node stg2n, may limit high-speed characteristics of the circuitry for processing data, and adversely affect data processing speeds. The same is true for the second sub-node stg1p and the fourth sub-node stg2p, it is equivalent that the second switch unit N2 and the sixth switch unit N6 are arranged in parallel between the second sub-node stg1p and the fourth sub-node stg2p, which may increase a parasitic capacitance between the second sub-node stg1p and the fourth sub-node stg2p, may also limit high-speed characteristics of the circuitry for processing data, and affect data processing speeds.

Figure 5:
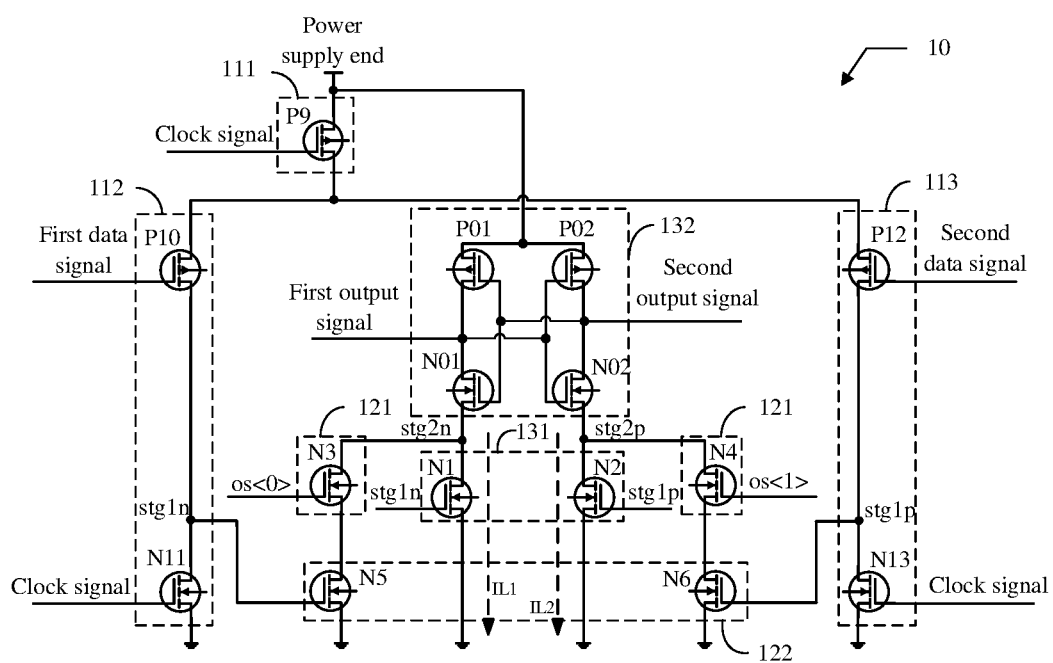
FIG. 5 is a third schematic diagram of specific structure of a circuitry for processing data according to an embodiment of the disclosure.

Therefore, with reference to FIG. 5, a third schematic diagram of composition structure of a circuitry 10 for processing data according to an embodiment of the disclosure is shown. As shown in FIG. 5, in some other specific embodiments, the second compensation circuit 122 includes a fifth switch unit N5 and a sixth switch unit N6.

The fifth switch unit N5 is provided with a control terminal configured to receive the first sub-node signal, a first terminal connected to the second terminal of the third switch unit N3, and a second terminal grounded.

The sixth switch unit N6 is provided with a control terminal configured to receive the second sub-node signal, a first terminal connected to the second terminal of the fourth switch unit N4, and a second terminal grounded.

It should be noted that compared to FIG. 4, positions of the third switch unit N3 and the fifth switch unit N5 are interchanged in FIG. 5, the control terminal of the fifth switch unit N5 is connected to the first sub-node stg1n to receive the first sub-node signal, the first terminal of the fifth switch unit N5 is connected to the second terminal of the third switch unit N3, the second terminal of the fifth switch unit N5 is grounded, and the first terminal of the third switch unit N3 is connected to the processing circuit through the third sub-node stg2n. At this point, the first sub-node signal controls a degree of conduction of the fifth switch unit N5, thereby controlling the output signal of the second terminal of the fifth switch unit N5; the control terminal of the third switch unit N3 receives the first initial compensation signal (os<0>), and the second terminal of the third switch unit N3 receives a signal from the first terminal of the fifth switch unit N5, thereby controlling the third switch unit N3 to determine the first target compensation signal by using the first initial compensation signal, and then combining the first target compensation signal and the signal at the first terminal of the first switch unit N1 into the third sub-node signal at the third sub-node stg2n, so that the first switch unit N1 obtains the compensated third sub-node signal. In this way, a parasitic capacitance between the first sub-node stg1n and the third sub-node stg2n is obtained by a series capacitance of the third switch unit N3 and the fifth switch unit N5 connected in series, connecting a capacitance of the first switch unit N1 in parallel. Compared to a capacitance of the fifth switch unit N5 and the first switch unit N1 connected in parallel, the above connection may effectively reduce the parasitic capacitance between the first sub-node stg1n and the third sub-node stg2n, thereby effectively improving high-speed characteristics of the circuitry for processing data and increasing data processing speeds.

The same is true for the second sub-node stg1p and the fourth sub-node stg2p. Compared to FIG. 4, positions of the fourth switch unit N4 and the sixth switch unit N6 are interchanged in FIG. 5, the control terminal of the sixth switch unit N6 is connected to the second sub-node stg1p to receive the second sub-node signal, the first terminal of the sixth switch unit N6 is connected to the second terminal of the fourth switch unit N4, the second terminal of the sixth switch unit N6 is grounded, and the first terminal of the fourth switch unit N4 is connected to the processing circuit through the fourth sub-node stg2p. At this point, the second sub-node signal controls a degree of conduction of the sixth switch unit N6, thereby controlling a signal at the second terminal of the sixth switch unit N6; the control terminal of the fourth switch unit N4 receives the second initial compensation signal (os<1>), and the second terminal of the fourth switch unit N4 receives a signal from the first terminal of the sixth switch unit N6, thereby controlling the fourth switch unit N4 to determine the second target compensation signal by using the second initial compensation signal, and then combining the second target compensation signal and the signal at the first terminal of the second switch unit N2 into the fourth sub-node signal at the fourth sub-node, so that the second switch unit N2 obtains the compensated fourth sub-node signal. In this way, a parasitic capacitance between the second sub-node stg1p and the fourth sub-node stg2p is obtained by a series capacitance of the fourth switch unit N4 and the sixth switch unit N6 connected in series, connecting a capacitance of the second switch unit N2 in parallel. Compared to a capacitance of the sixth switch unit N6 and the second switch unit N2 connected in parallel, the above connection may effectively reduce the parasitic capacitance between the second sub-node stg1p and the fourth sub-node stg2p, thereby effectively improving high-speed characteristics of the circuitry for processing data and increasing data processing speeds.

That is, compared to FIG. 4, according to the embodiments of the disclosure, positions of the third switch unit N3, the fourth switch unit N4, the fifth switch unit N5 and the sixth switch unit N6 are adjusted, so that the parasitic capacitance between the first sub-node stg1n and the third sub-node stg2n is reduced, and the parasitic capacitance between the second sub-node stg1p and the fourth sub-node stg2p is reduced, thereby improving high-speed characteristics of the circuitry for processing data and increasing data processing speeds.

Figure 6:
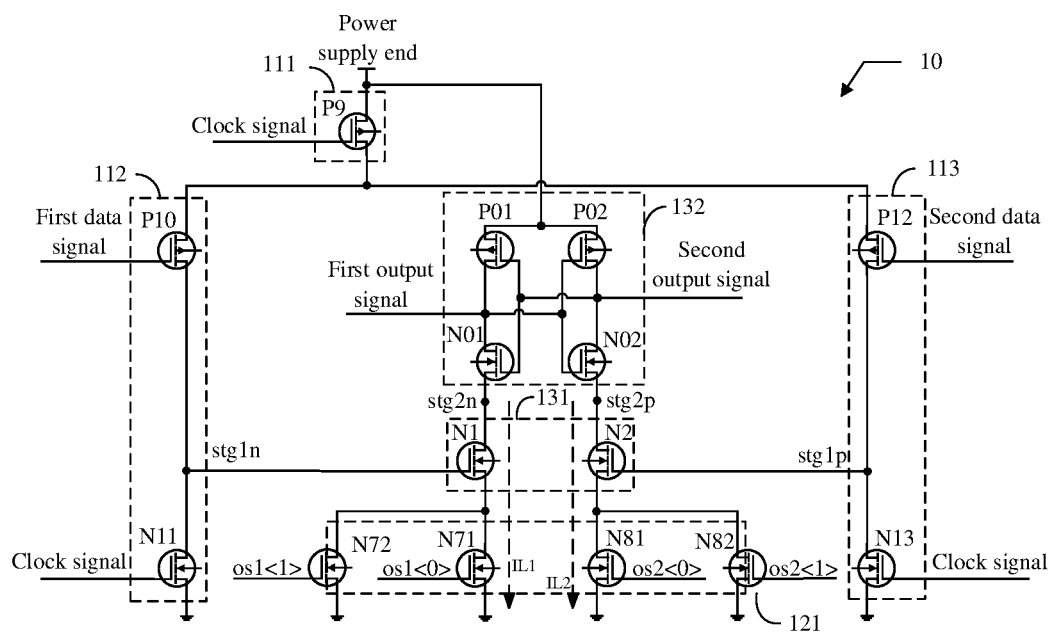
FIG. 6 is a fourth schematic diagram of specific structure of a circuitry for processing data according to an embodiment of the disclosure.

Furthermore, as to the compensation circuit, with reference to FIG. 6, a fourth schematic diagram of circuit structure of a circuitry 10 for processing data according to an embodiment of the disclosure is shown. As shown in FIG. 6, in some other specific embodiments, the initial compensation signal includes N first sub-compensation signals and M second sub-compensation signals, and each of M and N is a natural number.

Correspondingly, the compensation circuit 12 includes N seventh switch units connected in parallel and M eighth switch units connected in parallel.

Each of the seventh switch units is provided with a control terminal configured to receive a respective one of the first sub-compensation signals, a first terminal connected to the second terminal of the first switch unit N1, and a second terminal grounded.

Each of the eighth switch units is provided with a control terminal configured to receive a respective one of the second sub-compensation signals, a first terminal connected to the second terminal of the second switch unit N2, and a second terminal grounded.

It should be noted that the compensation circuit 12 may be composed of N seventh switch units connected in parallel and M eighth switch units connected in parallel. The control terminal of each of the seventh switch units receives a respective one of the first sub-compensation signals, the first terminal of each of the seventh switch units is connected to the second terminal of the first switch unit N1, and the second terminal of each of the seventh switch units is grounded. The control terminal of each of the eighth switch units receives a respective one of the second sub-compensation signals, the first terminal of each of the eighth switch units is connected to the second terminal of the second switch unit N2, and the second terminal of each of the eighth switch units is grounded.

M=2 and N=2 are taken as an example. As shown in FIG. 6, in order to facilitate distinction, two seventh switch units are marked as N71 and N72 respectively, and two eighth switch units are marked as N81 and N82 respectively. Corresponding to the two seventh switch units, there are also two first sub-compensation signals, i.e., os1<0> and os1<1> in FIG. 6 respectively; corresponding to the two eighth switch units, there are also two second sub-compensation signals, i.e., os2<0> and os2<1> in FIG. 6 respectively.

It should also be noted that in the embodiment of the disclosure, each of the seventh switch units and each of the eighth switch units being an NMOS transistor is taken as an example, the control terminal of each of these switch units may be gate, the first terminal thereof may be drain, and the second terminal thereof may be source.

As shown in FIG. 6, the control terminal of the seventh switch unit N71 receives the first sub-compensation signal os1<0>, the first terminal of the seventh switch unit N71 is connected to the second terminal of the first switch unit N1, the second terminal of the seventh switch unit N71 is grounded, the control terminal of the seventh switch unit N72 receives the first sub-compensation signal os1<1>, and connections of the first and second terminals of the seventh switch unit N72 are the same as those of the first and second terminals of the seventh switch unit N71. The first sub-compensation signal os1<0> controls a degree of conduction of the seventh switch unit N71, i.e., a signal at the first terminal of the seventh switch unit N71. Similarly, the first sub-compensation signal os1<1> controls a signal at the first terminal of the seventh switch unit N72. The signal at the first terminal of the seventh switch unit N71 and the signal at the first terminal of the seventh switch unit N72 are combined into the first target compensation signal, to be used as a signal at the second terminal of the first switch unit N1, so that the first switch unit N1 determines a third node signal according to the first sub-node signal and the first target compensation signal. With connections shown in FIG. 6, only parasitic capacitance generated by the first switch unit N1 is present between the first sub-node stg1n and the third sub-node stg2n, so that the parasitic capacitance is small, thereby effectively improving high-speed characteristics of the circuitry for processing data and increasing data processing speeds.

The same is true for the second sub-node stg1p and the fourth sub-node stg2p. As shown in FIG. 6, the control terminal of the eighth switch unit N81 receives the second sub-compensation signal os2<0>, the first terminal of the eighth switch unit N81 is connected to the second terminal of the second switch unit N2, the second terminal of the eighth switch unit N81 is grounded, the control terminal of the eighth switch unit N82 receives the second sub-compensation signal os2<1>, and connections of the first and second terminals of the eighth switch unit N82 are the same as those of the first and second terminals of the eighth switch unit N81. The second sub-compensation signal os2<0> controls a degree of conduction of the eighth switch unit N81, i.e., a signal at the first terminal of the eighth switch unit N81. Similarly, the second sub-compensation signal os2<1> controls a signal at the first terminal of the eighth switch unit N82. The signal at the first terminal of the eighth switch unit N81 and the signal at the first terminal of the eighth switch unit N82 are combined into the second target compensation signal, to be used as a signal at the second terminal of the second switch unit N2, so that the second switch unit N2 determines a fourth node signal according to the second sub-node signal and the second target compensation signal. With connections shown in FIG. 6, only parasitic capacitance generated by the second switch unit N2 is present between the second sub-node stg1p and the fourth sub-node stg2p, so that the parasitic capacitance is small, thereby effectively improving high-speed characteristics of the circuitry for processing data and increasing data processing speeds.

That is, compared to FIG. 4, the embodiments of the disclosure centrally arrange devices (the seventh switch unit and the eighth switch unit) which introduce deviations in adjusting and manufacturing processes, below the first switch unit N1 and the second switch unit N2 (that is, the devices are not arranged between nodes), so that the parasitic capacitance between the first sub-node stg1n and the third sub-node stg2n may also be reduced, and the parasitic capacitance between the second sub-node stg1p and the fourth sub-node stg2p may be reduced, thereby improving high-speed characteristics of the circuitry for processing data and increasing data processing speeds.

Furthermore, as to the cross-coupling circuit 132, in some embodiments, the cross-coupling circuit 132 is configured to amplify the third sub-node signal and the fourth sub-node signal and generate a first output signal and a second output signal respectively. Here, the target data signal is composed of the first output signal and the second output signal.

It should be noted that the cross-coupling circuit 132 differentially amplifies the third sub-node signal and the fourth sub-node signal, and outputs the target data signal. The target data signal specifically includes the first output signal and the second output signal.

With reference to FIG. 3 (or any one of FIG. 4 to FIG. 6), in some embodiments, the cross-coupling circuit 132 includes a first PMOS transistor P01, a second PMOS transistor P02, a first NMOS transistor N01 and a second NMOS transistor N02.

A source of the first PMOS transistor P01 is connected to a source of the second PMOS transistor P02 and is connected to the power supply end.

A drain of the first PMOS transistor P01 is connected to a drain of the first NMOS transistor N01, to output the first output signal.

A drain of the second PMOS transistor P02 is connected to a drain of the second NMOS transistor N02, to output the second output signal.

A gate of the first PMOS transistor P01 is connected to a gate of the first NMOS transistor N01, to receive the second output signal.

A gate of the second PMOS transistor P02 is connected to a gate of the second NMOS transistor N02, to receive the first output signal.

A source of the first NMOS transistor N01 is connected to the first terminal of the seventh switch unit N7, to receive the third sub-node signal.

A source of the second NMOS transistor N02 is connected to the first terminal of the eighth switch unit N8, to receive the fourth sub-node signal.

It should be noted that the cross-coupling circuit 132 is composed of a pair of NMOS transistors and a pair of PMOS transistors. The first terminal of each of the first NMOS transistor N01, the second NMOS transistor N02, the first PMOS transistor P01 and the second PMOS transistor P02 represents source, and the second terminal of each of the first NMOS transistor N01, the second NMOS transistor N02, the first PMOS transistor P01 and the second PMOS transistor P02 represents drain.

It should also be noted that in some embodiments, the circuitry 10 for processing data may further include a pre-charge circuit.

The pre-charge circuit is configured to pre-charge an initial data signal output by the processing circuit.

The processing circuit is further configured to perform signal amplification according to the first node signal and the initial data signal to output the target data signal, when the processing circuit is in an operation state.

It should be noted that the processing circuit is configured to amplify a slight difference between signals and finally output a pair of inverted output signals, and the pair of inverted output signals are the target data signals. Before amplifying signals, it is necessary to pre-charge the output signal of the processing circuit (i.e., the data signal has not been processed at this point, and the output signal of the processing circuit at this point is referred to as the initial data signal); this may be done by the pre-charge circuit (not shown in the figure), to pre-charge an initial data signal at the output of the processing circuit to a preset voltage value, for example, to VDD/2.

It should also be noted that the initial data signal includes a first initial data signal and a second initial data signal. After pre-charging, the gate signal of each of the second PMOS transistor P02 and the second NMOS transistor N02 is the first initial data signal, and the gate signal of each of the first PMOS transistor P01 and the first NMOS transistor M01 is the second initial data signal. A voltage of each of the first initial data signal and the second initial data signal may be VDD/2 (VDD represents the power supply voltage). The sources of the first PMOS transistor P01 and the second PMOS transistor P02 are connected to each other and connected to the power supply end. The source of the first NMOS transistor N01 and the first terminal of the first switch unit N1 are connected to the third sub-node stg2n, and the source of the second NMOS transistor N02 and the first terminal of the second switch unit N2 are connected to the fourth sub-node stg2p. When the processing circuit operates, the control terminal of the first switch unit N1 receives the first sub-node signal generated by control of the first data signal, and the control terminal of the second switch unit N2 receives the second sub-node signal generated by control of the second data signal. Since the first sub-node signal and the second sub-node signal are a pair of differential signals, a potential difference is present therebetween, so that the first switch unit N1 and the second switch unit N2 have different conduction speeds.

Exemplarily, since pre-charging has been performed, a voltage of the gate signal of each of the first NMOS transistor N01, the second NMOS transistor N02, the first PMOS transistor P01 and the second PMOS transistor P02 is VDD/2, then each of the four transistors is in the on-state at a very low degree. When a level state of the first data signal is lower than a level state of the second data signal, the level state of the first sub-node signal is higher than the level state of the second sub-node signal, then the first switch unit N1 may be turned on faster than the second switch unit N2, thereby pulling down the third sub-node signal to the low level state faster until the ground voltage is reached, so that the drain of the first NMOS transistor N01 is pulled down faster until the ground voltage is reached. The gate signal of the second PMOS transistor P02 is the drain signal of the first NMOS transistor N01, that is, the voltage of the gate signal of the second PMOS transistor is closer to the ground voltage, and compared to VDD/2 after precharging, a degree of conduction of the second PMOS transistor P02 may be increased, while the source of the second PMOS transistor P02 is kept connected to the power supply end, then the drain of the second PMOS transistor P02 may be closer to the power supply voltage to a greater extent; the drain signal of the second PMOS transistor P02 is the gate signal of the first NMOS transistor N01, that is, the gate signal of the first NMOS transistor N01 is closer to the power supply voltage, and compared to VDD/2 after pre-charging, a degree of conduction of the first NMOS transistor N01 may be increased, so that the drain of the first NMOS transistor N01 may be closer to the ground voltage to a greater extent. Therefore, the first output signal at a stable low level and the second output signal at a stable high level may be output finally through coupling and amplification of the cross-coupling circuit 132. Amplification and output of the differential signals is achieved.

It should also be noted that when the circuitry 10 for processing data is used as a circuitry for reading out data, the first data signal may represent a read-out signal, the second data signal may represent a reference signal, and a level state of the reference signal may always be VDD/2. When the first data signal is in the low level state, that is, the level state of the first data signal is lower than that of the second data signal, then the first sub-node signal is higher than the second sub-node signal, and finally, the first output signal is in the low level state, and the second output signal is in the high level state; when the first data signal is in the high level state, that is, the level state of the first data signal is higher than that of the second data signal, then the first sub-node signal is lower than the second sub-node signal, and finally, the first output signal is in the high level state, and the second output signal is in the low level state. Therefore, further amplification and output of difference between the differential signals is achieved, that is, "a relatively high level state is output to a high level, and a relatively low level state is output to a low level" is enabled.

That is, in case that the clock signal is in a first level state:
the first output signal is a first value and the second output signal is a second value, when a level state of the first data signal is greater than a level state of the second data signal; or
the first output signal is a second value and the second output signal is a first value, when the level state of the first data signal is less than the level state of the second data signal.

It should be noted that the first value may be 1, and the second value may be 0. That is, the processing circuit amplifies and outputs the data signal, and bleeds leakage current generated by the processing circuit. Furthermore, when the clock signal is in the first level state, the receiving circuit 11 is in a receiving state and charges the first sub-node stg1n and the second sub-node stg1p, to obtain the first sub-node signal and the second sub-node signal respectively, and the first sub-node signal and the second sub-node signal are processed and output by the processing circuit.

When the level state of the first data signal is greater than the level state of the second data signal, the first output signal is 1, and the second output signal is 0. In this way, when the circuitry 10 for processing data is a circuitry for reading data, the first data signal in the high level state is successfully read out and output. When the circuitry 10 for processing data is a comparator, the first output signal corresponds to the first data signal, and the second output signal corresponds to the second data signal, then a slight difference between the first data signal and the second data signal is significantly amplified, that is, "a high signal will become higher, a low signal will become lower." The same is true when the level state of the first data signal is less than the level state of the second data signal.

Furthermore, as shown in FIG. 2, in some embodiments, the circuitry 10 for processing data may further include a compensation signal generation circuit 14.

The compensation signal generation circuit 14 is configured to compare the target data signal with a standard signal to obtain a comparison result, and generate the initial compensation signal according to the comparison result.

It should be noted that the initial compensation signal may be generated by the compensation signal generation circuit 14. In particular, as shown in FIG. 2, the target data signal includes the first output signal and the second output signal. In case that current mismatch is not present in the circuit, the target data signal should be the first value or the second value. However, due to mismatch of the circuitry and existence of the current mismatch, the target data signal may deviate from the first value or the second value, resulting in inaccurate data. At this point, the compensation signal generation circuit 14 compares the target data signal with the standard signal, generates the initial compensation signal according to the comparison result, and feeds back the initial compensation signal to the compensation circuit 12, so that the compensation circuit 12 performs compensation control on the processing circuit 13, to output an accurate target data signal finally.

The standard signal may include a first standard signal and a second standard signal which are the foregoing first value or second value respectively. For example, when the first standard signal is the first value, and the second standard signal is the second value, then the first output signal should be the first value, and the second output signal should be the second value. The first output signal is compared with the first standard signal to determine a first comparison result, the first initial compensation signal is obtained according to the first comparison result; the second output signal is compared with the second standard signal to determine a second comparison result, and the second initial compensation signal is obtained according to the second comparison result.

It should also be noted that the initial compensation signal (including the first initial compensation signal and the second initial compensation signal) may be a waveform signal, or a digital control code, or other signals, which is not specifically limited in the embodiments of the disclosure.

Furthermore, the initial compensation signal may also be generated in other ways and is not limited to the way shown here. For example, the embodiments of the disclosure may also combine characteristics of the first switch unit N1 and the second switch unit N2 themselves, to obtain the initial compensation signal.

The embodiments of the disclosure provide a circuitry for processing data, including a receiving circuit, a compensation circuit and a processing circuit. The receiving circuit is configured to receive a data signal, and determine a first node signal according to the data signal. The compensation circuit is configured to receive an initial compensation signal, and determine a target compensation signal according to the initial compensation signal. The processing circuit is configured to output a target data signal according to the first node signal and the target compensation signal. In this way, current mismatch of the processing circuit during operation may be reduced by the compensation circuit, and when the processing circuit processes the first node signal according to the target compensation signal, the target data signal output finally is a compensated data signal, which improves output accuracy; furthermore, parasitic capacitance between nodes may also be reduced by performing design adjustment on composition of the compensation circuit, thereby improving high-speed characteristics of the circuitry for processing data and improving data processing speeds.

Figure 7:
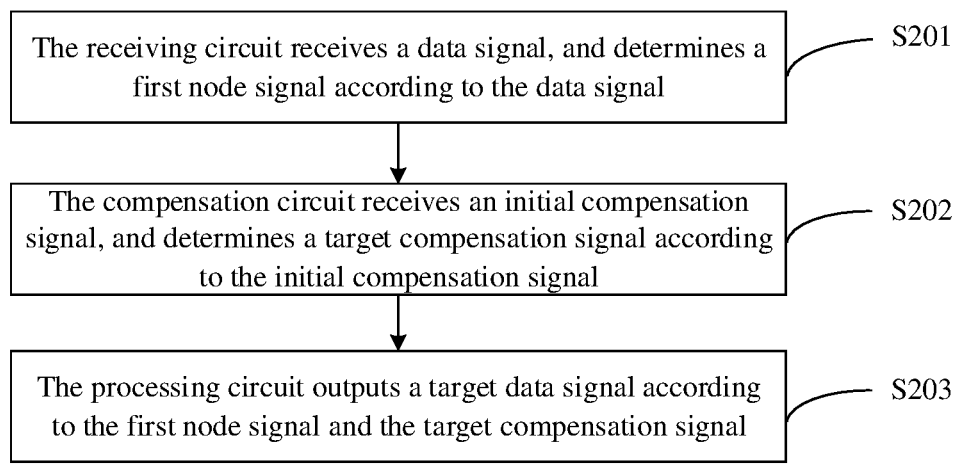
FIG. 7 is a schematic flowchart of a method for processing data according to an embodiment of the disclosure.

In another embodiment of the disclosure, based on the circuitry 10 for processing data described in any one of the foregoing embodiments, with reference to FIG. 7, it is illustrated a schematic flowchart of a method for processing data according to an embodiment of the disclosure. As shown in FIG. 7, the method may include the following operations S201 to S203.

At S201, a data signal is received by the receiving circuit, and a first node signal is determined by the receiving circuit according to the data signal.

At S202, an initial compensation signal is received by the compensation circuit, and a target compensation signal is determined by the compensation circuit according to the initial compensation signal.

At S203, a target data signal is output by the processing circuit according to the first node signal and the target compensation signal.

In some embodiments, the processing circuit includes a bleeding circuit and a cross-coupling circuit. The operation of outputting the target data signal by the processing circuit according to the first node signal and the target compensation signal includes the following operations.

The first node signal and the target compensation signal are received by the bleeding circuit, and a second node signal is determined according to the first node signal and the target compensation signal.

The second node signal is amplified by the cross-coupling circuit, and the target data signal is output.

In some embodiments, the bleeding circuit includes a first switch unit and a second switch unit, the first node signal includes a first sub-node signal and a second sub-node signal, and the second node signal includes a third sub-node signal and a fourth sub-node signal. The method may further include the following operations.

The first sub-node signal is received by a control terminal of the first switch unit, and the third sub-node signal is determined by a first terminal of the first switch unit.

The second sub-node signal is received by a control terminal of the second switch unit, and the fourth sub-node signal is determined by a first terminal of the second switch unit.

In some embodiments, the compensation circuit includes a first compensation circuit, and the initial compensation signal includes a first initial compensation signal and a second initial compensation signal. The operation of receiving the initial compensation signal by the compensation circuit, and determining the target compensation signal according to the initial compensation signal includes the following operations.

The first initial compensation signal and the second initial compensation signal are received by the first compensation circuit, compensation control is performed on the first initial compensation signal to generate a first target compensation signal; and compensation control is performed on the second initial compensation signal to generate a second target compensation signal.

In some embodiments, the first compensation circuit includes a third switch unit and a fourth switch unit. The operation of determining the target compensation signal according to the initial compensation signal includes the following operations.

The first initial compensation signal is received by a control terminal of the third switch unit, the first target compensation signal is determined by a first terminal of the third switch unit.

The second initial compensation signal is received by a control terminal of the fourth switch unit, the second target compensation signal is determined by a first terminal of the fourth switch unit.

In some embodiments, the compensation circuit further includes a second compensation circuit. The method may further include the following operations.

The first sub-node signal and the second sub-node signal are received by the second compensation circuit, the first target compensation signal is enhanced according to the first sub-node signal, and the second target compensation signal is enhanced according to the second sub-node signal.

In some embodiments, the second compensation circuit includes a fifth switch unit and a sixth switch unit. The method may include the following operations.

The first sub-node signal is received by a control terminal of the fifth switch unit, and the first target compensation signal is determined by a first terminal of the fifth switch unit.

The second sub-node signal is received by a control terminal of the sixth switch unit, and the second target compensation signal is determined by a first terminal of the sixth switch unit.

In some embodiments, the second compensation circuit includes a fifth switch unit and a sixth switch unit. The method may further include the following operations.

The first sub-node signal is received by a control terminal of the fifth switch unit.

The second sub-node signal is received by a control terminal of the sixth switch unit.

In some embodiments, the initial compensation signal includes N first sub-compensation signals and M second sub-compensation signals, and each of M and N is a natural number. Correspondingly, the compensation circuit includes N seventh switch units connected in parallel and M eighth switch units connected in parallel. The method may further include the following operations.

Each of the first sub-compensation signals is received by a control terminal of a respective one of the seventh switch units.

Each of the second sub-compensation signals is received by a control terminal of a respective one of the eighth switch units.

In some embodiments, the operation of amplifying the second node signal by the cross-coupling circuit, and outputting the target data signal may include the following operations.

The third sub-node signal and the fourth sub-node signal are amplified by the cross-coupling circuit to generate a first output signal and a second output signal respectively, here, the target data signal is composed of the first output signal and the second output signal.

In some embodiments, the receiving circuit includes a power supply circuit, a first control circuit and a second control circuit, and the data signal may include a first data signal and a second data signal. The operation of receiving the data signal by the receiving circuit, and determining the first node signal according to the data signal includes the following operations.

A clock signal is received by the power supply circuit, and connection states between a power supply end and each of the first control circuit and the second control circuit are controlled according to the clock signal.

The first data signal is received by the first control circuit, the first data signal is controlled according to the connection state between the power supply end and the first control circuit, to generate the first sub-node signal.

The second data signal is received by the second control circuit, the second data signal is controlled according to the connection state between the power supply end and the second control circuit, to generate the second sub-node signal.

In some embodiments, the power supply circuit includes a ninth switch unit. The operation of receiving the clock signal by the power supply circuit, and controlling connection states between the power supply end and each of the first control circuit and the second control circuit according to the clock signal includes the following operations.

The clock signal is received by a control terminal of the ninth switch unit, the ninth switch unit is in an on-state when the clock signal is in a first level state, so that the first control circuit and the second control circuit are both connected to the power supply end; and the ninth switch unit is in an off-state when the clock signal is in a second level state, so that the first control circuit and the second control circuit are disconnected from the power supply end.

In some embodiments, the first control circuit includes a tenth switch unit and an eleventh switch unit, and the second control circuit includes a twelfth switch unit and a thirteenth switch unit. The method may further include the following operations.

The first data signal is received by a control terminal of the tenth switch unit, the clock signal is received by a control terminal of the eleventh switch unit, and the first sub-node signal is output by a first terminal of the tenth switch unit.

The second data signal is received by a control terminal of the twelfth switch unit, the clock signal is received by a control terminal of the thirteenth switch unit, and the second sub-node signal is output by a first terminal of the twelfth switch unit.

In some embodiments, the method may further include the following operations.

The eleventh switch unit is controlled by the first control circuit to be in an off-state when the clock signal is in the first level state, and the eleventh switch unit is controlled by the first control circuit to be in an on-state when the clock signal is in the second level state.

The thirteenth switch unit is controlled by the second control circuit to be in an off-state when the clock signal is in the first level state, and the thirteenth switch unit is controlled by the second control circuit to be in an on-state when the clock signal is in the second level state.

In some embodiments, the cross-coupling circuit includes a first PMOS transistor, a second PMOS transistor, a first NMOS transistor and a second NMOS transistor. The operation of amplifying the third sub-node signal and the fourth sub-node signal by the cross-coupling circuit, to generate the first output signal and the second output signal respectively includes the following operations.

The third sub-node signal is received by a source of the first NMOS transistor and the first terminal of the seventh switch unit.

The fourth sub-node signal is received by a source of the second NMOS transistor and the first terminal of the eighth switch unit.

The first output signal is output by a drain of the first PMOS transistor and a drain of the first NMOS transistor.

The second output signal is output by a drain of the second PMOS transistor and a drain of the second NMOS transistor.

The second output signal is received by a gate of the first PMOS transistor and a gate of the first NMOS transistor.

The first output signal is received by a gate of the second PMOS transistor and a gate of the second NMOS transistor.

In some embodiments, in case that the clock signal is in a first level state:

the first output signal is a first value and the second output signal is a second value, when a level state of the first data signal is greater than a level state of the second data signal; or the first output signal is a second value and the second output signal is a first value, when the level state of the first data signal is less than the level state of the second data signal.

In some embodiments, the circuitry for processing data further includes a compensation signal generation circuit. The method may further include the following operations.

The target data signal is compared with a standard signal by the compensation signal generation circuit to obtain a comparison result, and the initial compensation signal is generated according to the comparison result.

In some embodiments, the circuitry for processing data may further include a pre-charge circuit. The method may further include the following operations.

An initial data signal output by the processing circuit is pre-charged by the pre-charge circuit.

Correspondingly, the operation of outputting the target data signal by the processing circuit according to the first node signal, when the processing circuit is in an operation state includes the following operations.

Signal amplification is performed by the processing circuit according to the first node signal and the initial data signal to output the target data signal, when the processing circuit is in an operation state.

Details not disclosed in the embodiments of the disclosure are understood with reference to descriptions of the foregoing embodiments.

The embodiments of the disclosure provide a method for processing data, applied to the foregoing circuitry for processing data. According to the method, the target data signal output finally is a compensated data signal, which improves output accuracy; furthermore, parasitic capacitance between nodes may also be reduced by performing design adjustment on composition of the compensation circuit, thereby improving high-speed characteristics of the circuitry for processing data and improving data processing speeds.

Figure 8:
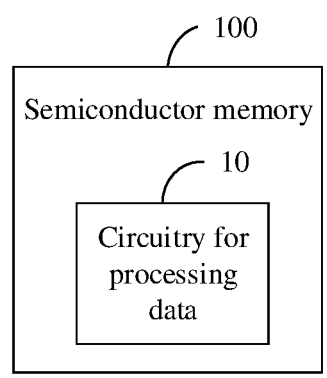
FIG. 8 is a schematic diagram of composition structure of a semiconductor memory according to an embodiment of the disclosure.

In yet another embodiment of the disclosure, with reference to FIG. 8, a schematic diagram of composition structure of a semiconductor memory 100 according to an embodiment of the disclosure is shown. As shown in FIG. 8, the semiconductor memory 100 may include the circuitry 10 for processing data described in any one of the foregoing embodiments.

The semiconductor memory 100 may be a Dynamic Random Access Memory (DRAM) or the like, and may conform to a 5th Double Data Rate memory specification.

As to the semiconductor memory 100, since the semiconductor memory 100 includes the circuitry 10 for processing data in the foregoing embodiments, current mismatch may be reduced so that the output data result is more accurate and reliable; furthermore, parasitic capacitance between nodes may also be reduced, thereby improving high-speed characteristics of the circuitry for processing data and improving data processing speeds.

The above descriptions are only preferred embodiments of the disclosure, and are not intended to limit the scope of protection of the disclosure.

It should be noted that in the disclosure, terms "include", "including" or any other variants thereof are intended to cover non-exclusive inclusion, so that a process, method, article or device including a series of elements not only includes those elements, but also includes other elements which are not explicitly listed, or elements inherent to such process, method, article or device. In the absence of more limitations, an element defined by a phrase "includes a . . . " does not preclude existence of other same elements in the process, method, article or device including this element.

Serial numbers of the above embodiments of the disclosure are merely for description, and do not represent advantages and disadvantages of the embodiments.

Methods disclosed in several method embodiments provided in the disclosure may be arbitrarily combined without conflict, to obtain a new method embodiment.

Features disclosed in several product embodiments provided in the disclosure may be arbitrarily combined without conflict, to obtain a new product embodiment.

Features disclosed in several method or device embodiments provided in the disclosure may be arbitrarily combined without conflict, to obtain a new method or device embodiment.

The above descriptions are merely specific implementations of the disclosure, however, the scope of protection of the disclosure is not limited thereto. Any variation or replacement apparent to those skilled in the art within the technical scope disclosed by the disclosure shall fall within the scope of protection of the disclosure. Therefore, the scope of protection of the disclosure shall be subjected to the scope of protection of the claims.

INDUSTRIAL APPLICABILITY

The embodiments of the disclosure provide a circuitry and method for processing data, and a semiconductor memory. The circuitry for processing data includes a receiving circuit, a compensation circuit and a processing circuit. The receiving circuit is configured to receive a data signal, and determine a first node signal according to the data signal. The compensation circuit is configured to receive an initial compensation signal, and determine a target compensation signal according to the initial compensation signal. The processing circuit is configured to output a target data signal according to the first node signal and the target compensation signal. In this way, current mismatch of the processing circuit during operation may be reduced by the compensation circuit, and when the processing circuit processes the first node signal according to the target compensation signal, the target data signal output finally is a compensated data signal, which improves output accuracy; furthermore, parasitic capacitance between nodes may also be reduced by performing design adjustment on composition of the compensation circuit, thereby improving high-speed characteristics of the circuitry for processing data and improving data processing speeds.

The invention claimed is:

1. A circuitry for processing data, comprising:
a receiving circuit, configured to receive a data signal, and determine a first node signal according to the data signal;
a compensation circuit, configured to receive an initial compensation signal, and determine a target compensation signal according to the initial compensation signal; and
a processing circuit, comprising:
a bleeding circuit, configured to receive the first node signal and the target compensation signal, and determine a second node signal according to the first node signal and the target compensation signal; and
a cross-coupling circuit, configured to amplify the second node signal, to output the target data signal.

2. The circuitry of claim 1, wherein
the bleeding circuit comprises a first switch unit and a second switch unit, and the first node signal comprises a first sub-node signal and a second sub-node signal,
wherein the first switch unit is provided with a control terminal configured to receive the first sub-node signal, a second terminal grounded, and a first terminal connected to the cross-coupling circuit to determine a third sub-node signal, and
wherein the second switch unit is provided with a control terminal configured to receive the second sub-node signal, a second terminal grounded, and a first terminal connected to the cross-coupling circuit to determine a fourth sub-node signal.

3. The circuitry of claim 2, wherein
the compensation circuit comprises a first compensation circuit, and the initial compensation signal comprises a first initial compensation signal and a second initial compensation signal,
wherein the first compensation circuit is configured to receive the first initial compensation signal and the second initial compensation signal, perform compensation control on the first initial compensation signal to generate a first target compensation signal, and perform compensation control on the second initial compensation signal to generate a second target compensation signal.

4. The circuitry of claim 3, wherein
the first compensation circuit comprises:
a third switch unit, provided with a control terminal configured to receive the first initial compensation signal, a first terminal connected to the first terminal of the first switch unit and the processing circuit to determine the first target compensation signal, and a second terminal grounded; and
a fourth switch unit, provided with a control terminal configured to receive the second initial compensation signal, a first terminal connected to the first terminal of the second switch unit and the processing circuit to determine the second target compensation signal, and a second terminal grounded.

5. The circuitry of claim 4, wherein
the compensation circuit further comprises:
a second compensation circuit, configured to receive the first sub-node signal and the second sub-node signal, enhance the first target compensation signal according to the first sub-node signal, and enhance the second target compensation signal according to the second sub-node signal.

6. The circuitry of claim 5, wherein
the second compensation circuit comprises:
a fifth switch unit, provided with a control terminal configured to receive the first sub-node signal, a second terminal connected to the first terminal of the third switch unit, and a first terminal connected to the first terminal of the first switch unit and the processing circuit to determine the first target compensation signal; and
a sixth switch unit, provided with a control terminal configured to receive the second sub-node signal, a second terminal connected to the first terminal of the fourth switch unit, and a first terminal connected to the first terminal of the second switch unit and the processing circuit to determine the second target compensation signal.

7. The circuitry of claim 5, wherein
the second compensation circuit comprises:
a fifth switch unit, provided with a control terminal configured to receive the first sub-node signal, a first terminal connected to the second terminal of the third switch unit, and a second terminal grounded; and
a sixth switch unit, provided with a control terminal configured to receive the second sub-node signal, a first terminal connected to the second terminal of the fourth switch unit, and a second terminal grounded.

8. The circuitry of claim 2, wherein
the initial compensation signal comprises N first sub-compensation signals and M second sub-compensation signals, and each of M and N is a natural number,
correspondingly, the compensation circuit comprises N seventh switch units connected in parallel and M eighth switch units connected in parallel,
wherein each of the seventh switch units is provided with a control terminal configured to receive a respective one of the first sub-compensation signals, a first terminal connected to the second terminal of the first switch unit, and a second terminal grounded; and
wherein each of the eighth switch units is provided with a control terminal configured to receive a respective one of the second sub-compensation signals, a first terminal connected to the second terminal of the second switch unit, and a second terminal grounded.

9. The circuitry of claim 2, wherein
the cross-coupling circuit is configured to amplify the third sub-node signal and the fourth sub-node signal to generate a first output signal and a second output signal respectively,
wherein the target data signal is composed of the first output signal and the second output signal.

10. The circuitry of claim 9, wherein
the receiving circuit comprises a power supply circuit, a first control circuit and a second control circuit, and the data signal comprises a first data signal and a second data signal, wherein
the power supply circuit is configured to receive a clock signal, and control connection states between a power supply end and each of the first control circuit and the second control circuit according to the clock signal,
the first control circuit is configured to receive the first data signal, control the first data signal according to the connection state between the power supply end and the first control circuit, to generate the first sub-node signal,
the second control circuit is configured to receive the second data signal, control the second data signal according to the connection state between the power supply end and the second control circuit, to generate the second sub-node signal.

11. The circuitry of claim 10, wherein
the power supply circuit comprises a ninth switch unit provided with a control terminal configured to receive the clock signal, a first terminal connected to the first control circuit and the second control circuit respectively, and a second terminal connected to the power supply end,
wherein the power supply circuit is configured to:
control the ninth switch unit to be in an on-state when the clock signal is in a first level state, so that the first control circuit and the second control circuit are both connected to the power supply end; and
control the ninth switch unit to be in an off-state when the clock signal is in a second level state, so that the first control circuit and the second control circuit are disconnected from the power supply end.

12. The circuitry of claim 11, wherein
the first control circuit comprises a tenth switch unit and an eleventh switch unit, and the second control circuit comprises a twelfth switch unit and a thirteenth switch unit,
wherein a control terminal of the tenth switch unit is configured to receive the first data signal, a second terminal of the tenth switch unit is connected to the first terminal of the ninth switch unit, a control terminal of the eleventh switch unit is configured to receive the clock signal, and a second terminal of the eleventh switch unit is grounded; a first terminal of the tenth switch unit is connected to a first terminal of the eleventh switch unit to output the first sub-node signal, and
wherein a control terminal of the twelfth switch unit is configured to receive the second data signal, a second terminal of the twelfth switch unit is connected to the first terminal of the ninth switch unit, a control terminal of the thirteenth switch unit is configured to receive the clock signal, and a second terminal of the thirteenth switch unit is grounded; a first terminal of the twelfth switch unit is connected to a first terminal of the thirteenth switch unit to output the second sub-node signal.

13. The circuitry of claim 12, wherein
the first control circuit is configured to control the eleventh switch unit to be in an off-state when the clock signal is in the first level state, and control the eleventh switch unit to be in an on-state when the clock signal is in the second level state, and
the second control circuit is configured to control the thirteenth switch unit to be in an off-state when the clock signal is in the first level state, and control the thirteenth switch unit to be in an on-state when the clock signal is in the second level state.

14. The circuitry of claim 13, wherein
the cross-coupling circuit comprises a first P-type channel Metal Oxide Semiconductor (PMOS) transistor, a second PMOS transistor, a first N-type channel Metal Oxide Semiconductor (NMOS) transistor, and a second NMOS transistor,
wherein a source of the first PMOS transistor is connected to a source of the second PMOS transistor, and is connected to the power supply end,
a drain of the first PMOS transistor is connected to a drain of the first NMOS transistor, to output the first output signal,
a drain of the second PMOS transistor is connected to a drain of the second NMOS transistor, to output the second output signal,
a gate of the first PMOS transistor is connected to a gate of the first NMOS transistor, to receive the second output signal,
a gate of the second PMOS transistor is connected to a gate of the second NMOS transistor, to receive the first output signal,
a source of the first NMOS transistor is connected to the first terminal of the first switch unit, to receive the third sub-node signal, and
a source of the second NMOS transistor is connected to the first terminal of the second switch unit, to receive the fourth sub-node signal.

15. The circuitry of claim 10, wherein when the clock signal is in a first level state:

the first output signal is a first value and the second output signal is a second value, in response to determining that a level state of the first data signal is greater than a level state of the second data signal; and the first output signal is the second value and the second output signal is the first value, in response to determining that the level state of the first data signal is less than the level state of the second data signal.

16. The circuitry of claim 1, further comprising:

a compensation signal generation circuit, configured to compare the target data signal with a standard signal to obtain a comparison result, and generate the initial compensation signal according to the comparison result.

17. The circuitry of claim 1, further comprising:

a pre-charge circuit, configured to pre-charge an initial data signal output by the processing circuit, wherein the processing circuit is further configured to perform signal amplification according to the first node signal and the initial data signal to output the target data signal, when the processing circuit is in an operation state.

18. The circuitry of claim 1, wherein the compensation circuit is connected before the bleeding circuit, configured to compensates and adjusts the bleeding circuit by using the target compensation signal to reduce mismatch of compensation capability of the bleeding circuit.

19. A method for processing data, applied to a circuitry for processing data which comprises a receiving circuit, a compensation circuit and a processing circuit, wherein the processing circuit comprises a bleeding circuit and a cross-coupling circuit, the method comprising:

receiving, by the receiving circuit, a data signal, and determining a first node signal according to the data signal;

receiving, by the compensation circuit, an initial compensation signal, and determining a target compensation signal according to the initial compensation signal;

receiving, by the bleeding circuit, the first node signal and the target compensation signal, and determine a second node signal according to the first node signal and the target compensation signal; and amplifying, by the cross-coupling circuit, the second node signal, to output the target data signal.

20. A semiconductor memory, comprising a circuitry for processing data, wherein the circuitry for processing data comprises:

a receiving circuit, configured to receive a data signal, and determine a first node signal according to the data signal;

a compensation circuit, configured to receive an initial compensation signal, and determine a target compensation signal according to the initial compensation signal; and a processing circuit, comprising:

a bleeding circuit, configured to receive the first node signal and the target compensation signal, and determine a second node signal according to the first node signal and the target compensation signal; and a cross-coupling circuit, configured to amplify the second node signal, to output the target data signal.

\* \* \* \* \*